W. P. PRICKETT.
FURNACE FOR MELTING METALS, GLASS, &c.
No. 78,007. Patented May 19, 1868.
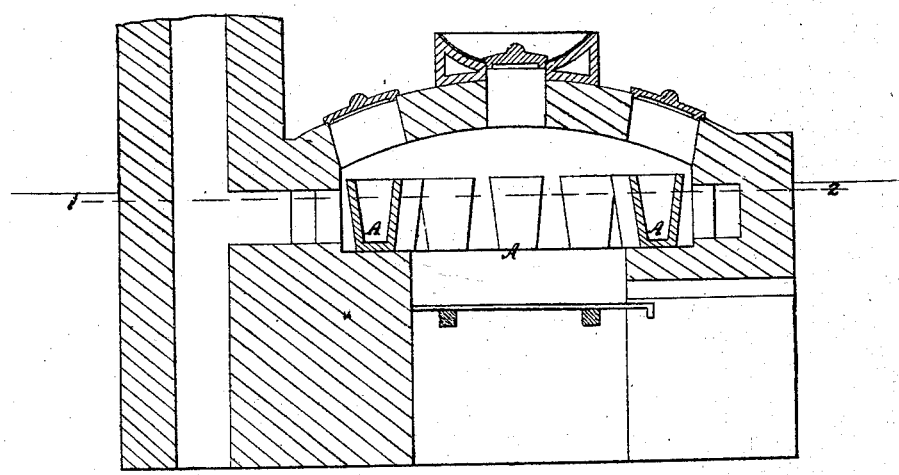
*Longitudinal Section.*
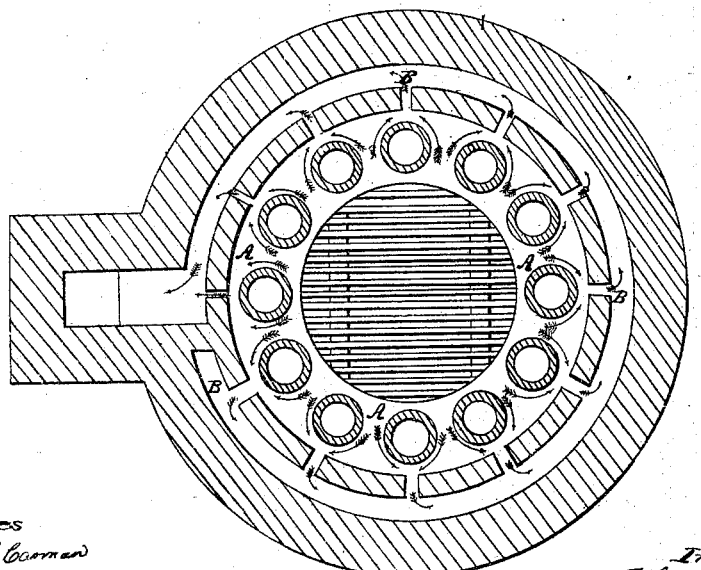
*Horizontal Section Through 1-2.*
Witnesses
William H. Carman
James H. Ogden
Inventor
William P. Prickett

UNITED STATES PATENT OFFICE.

WILLIAM P. PRICKETT, OF PHILADELPHIA, PENNSYLVANIA.

IMPROVED FURNACE FOR MELTING METALS, GLASS, &c.

Specification forming part of Letters Patent No. 78,007, dated May 19, 1868.

*To all whom it may concern:*

Be it known that I, WILLIAM P. PRICKETT, of Philadelphia, in the county of Philadelphia, in the State of Pennsylvania, have invented a new and Improved Furnace for Melting Brass, Glass, or any material that is melted in a pot or crucible; and I do hereby declare that the following is a full and exact description thereof, reference being had to the accompanying drawings—

Figure 1 being a longitudinal section; Fig. 2, a horizontal section.

The nature of my invention consists in providing the furnace with an inside base, around and above the fire, upon which the pots or crucibles rest, as A A A, Figs. 1 and 2, and in making a small aperture directly behind the position of each pot or crucible, as B B B, Fig. 2, leading into a surrounding flue, from thence into the main stack; the object being to economize the heat of the coal consumed by forcing it to go through the said apertures, and consequently around and about each pot, as shown by arrows in Fig. 2, thereby getting all the benefit of the heat and causing a great saving of coal.

To enable others skilled in the art to make and use my invention, I will proceed to describe its construction and operation.

I construct my furnace in any of the known forms, with grate, receptacle for coal, ashes, &c., and around and above the fire I build a base sufficiently wide for the pots or crucibles to rest upon, and in the rear of each pot or crucible I make an aperture or flue, which leads into a surrounding flue, obstructed at one end and the other communicating with the stack or chimney, said small apertures or flues increasing in size as they approach the obstructed end of the surrounding flue, in order to equalize the draft around each pot or crucible, or to accomplish the same end by making the small apertures or flues all of the same size, and enlarging the surrounding flue as it approaches the chimney or stack.

What I claim as my invention, and desire to secure by Letters Patent, is—

The application, to furnaces, of the base upon which the pots or crucibles rest, and the small apertures opposite each that lead into the surrounding flue, and from thence into the main stack or chimney, substantially as herein described and set forth.

WILLIAM P. PRICKETT.

Witnesses:
WILLIAM H. CARMAN,
JAMES H. OGDEN.